United States Patent [19]
Yong O

[11] Patent Number: 4,657,298
[45] Date of Patent: Apr. 14, 1987

[54] VEHICLE PROTECTIVE COVER DEVICE

[76] Inventor: Sung Yong O, 4707 Chevy Chase Dr. #208, Chevy Chase, Md. 20815

[21] Appl. No.: 835,740

[22] Filed: Mar. 3, 1986

[51] Int. Cl.⁴ .............................................. B60J 7/20
[52] U.S. Cl. ...................................... 296/136; 135/88
[58] Field of Search ............... 296/136, 98; 135/88; 160/238

[56] References Cited

U.S. PATENT DOCUMENTS

| | | | |
|---|---|---|---|
| 1,719,055 | 7/1929 | Herzer | 296/136 |
| 1,918,423 | 7/1933 | Persinger | 296/136 |
| 3,563,594 | 2/1971 | London | 296/98 |
| 3,774,958 | 11/1973 | Thorpe | 160/238 |
| 4,174,134 | 11/1979 | Mathis | 296/136 |
| 4,432,581 | 2/1984 | Guma | 296/136 |

Primary Examiner—Robert R. Song
Attorney, Agent, or Firm—Birch, Stewart, Kolasch & Birch

[57] ABSTRACT

A vehicle protective cover device adapted to be attached to a vehicle which comprises, a container, a sheet material wound around a roller, the roller being rotatably disposed within the container, the sheet material having a free end which is provided with a rod member, and motor means operatively associated with the roller whereby after the sheet material has been extended from the roller to cover the vehicle, the motor can be actuated to retract the sheet material to be stored within its container.

10 Claims, 3 Drawing Figures

VEHICLE PROTECTIVE COVER DEVICE

BACKGROUND OF THE INVENTION

The present invention relates to a vehicle protective cover device and more particularly, to a vehicle protective cover device which is horizontally movable for use to cover the roof of a vehicle. The vehicle protective cover can be fully extended or rolled up into a compact form.

There are many types of vehicle covers which are well known in the art which utilize a tent-like structure which corresponds to the structure of the vehicle. However, these tent-like covers suffer from a number of disadvantages, such as, for example, they are difficult to remove from the vehicle, and it is inconvenient to store them in the vehicle or in separate locations. Furthermore, in any case, it is inconvenient for the vehicle cover to be removed from the vehicle.

OBJECTS AND SUMMARY OF THE INVENTION

Accordingly, it is an object of the present invention to provide an improved vehicle protective cover device for protecting the roof of the vehicle from snow, rain, dust or the like.

Another object of the present invention is to provide a vehicle protective cover device which can be fully extended or rolled up into a compact form and stored in a container. The container housing the rolled-up cover is mounted to a front top portion of the trunk of the vehicle.

A further object of the present invention is to provide a readily attachable and detachable vehicle protective cover device.

Still another object of the present invention is to provide a vehicle protective cover device which is rolled into a roller according to an on-off switch disposed at a front area of the driver seat.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the detailed description.

The present invention pertains to a vehicle protective cover device which is simple to manufacture and easy to operate, and is very easy to attach to or detach from the vehicle. Also, the length of the cover can be extended to the length desired by the user or automatically rolled into a compact state and stored in a container which is mounted to a top portion of the trunk of the vehicle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
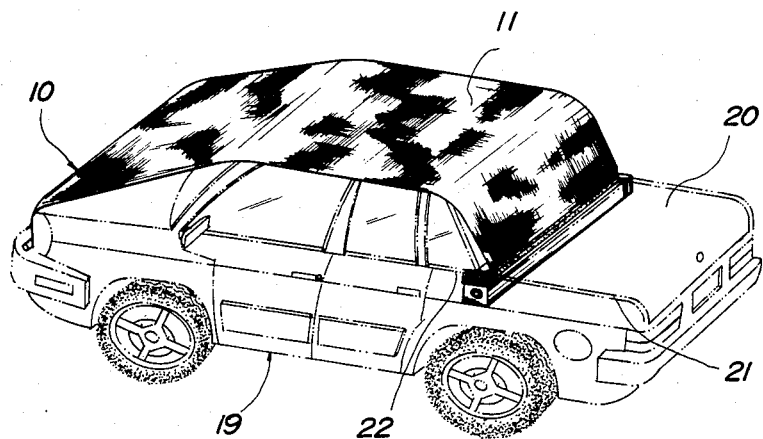
FIG. 1 is a perspective view of the vehicle cover device of the present invention extending across the roof of the vehicle.
Figure 2:
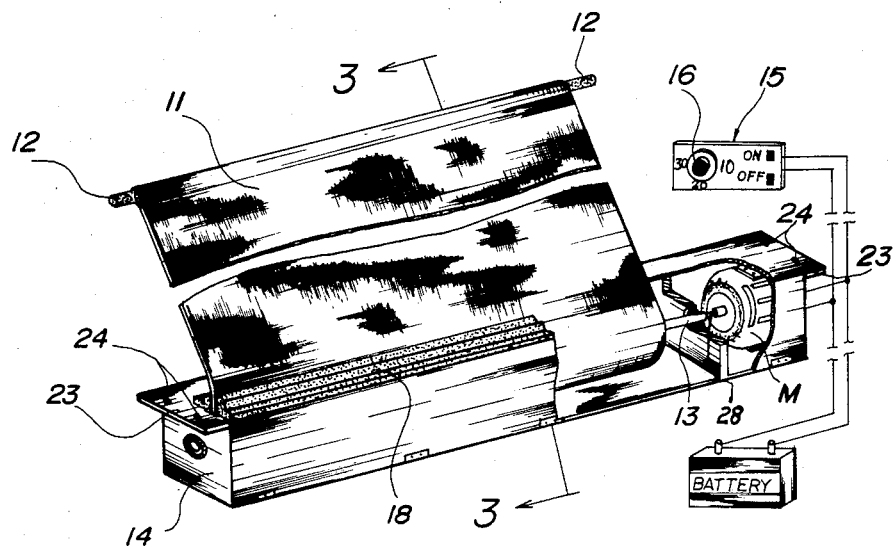
FIG. 2 is a perspective view of the vehicle cover device of the present invention showing in a cut away portion thereof the cover extended from a roller.
Figure 3:
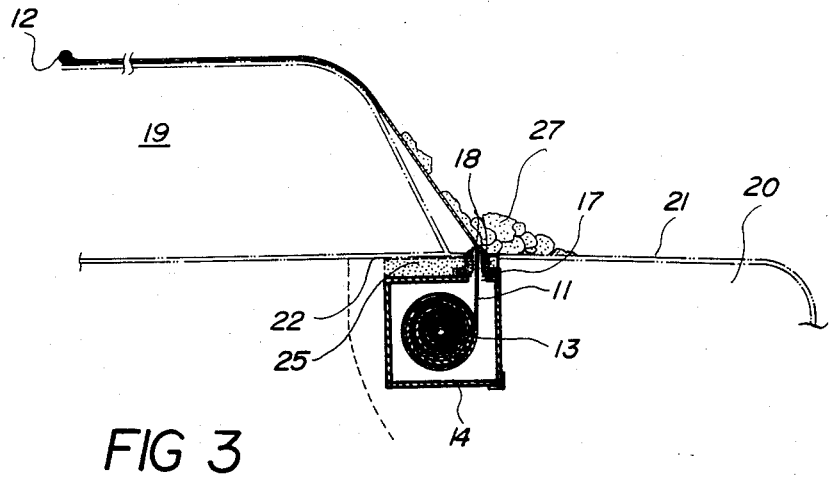
FIG. 3 is a cross-sectional view of the rolled up cover of the present invention stored in a container, taken along line 3—3 of FIG. 2.

Referring now in detail to the drawings for the purpose of illustrating the present invention, the vehicle protective cover device 10 as shown in FIG. 1 comprises a sheet material 11 made of a water-proof plastic film such as polyethylene or polyvinyl chloride, a rod member 12 made of a plastic or a rubber material which is attached to the front end of the sheet material 11, and a roller 13 fixed to the other end of the sheet material 11. The roller 11, rotatably mounted to a shaft member 28 is placed in a container 14. The shaft member 28 is connected to a motor M which is in turn connected to a battery and a switch plate 15 including a speed indicator 16 (FIG. 2). The switch plate 15 is mounted to a front portion of the vehicle where it can be accessible to the driver. The container 14 is provided with rubber gaskets 18 disposed around an entrance 17 for sealing the container. Flanges 23 are provided with holes 24 for mounting the container 14 to a front top portion 22 of the trunk 20 of the vehicle 19 by bolts (not seen) as shown in FIG. 3. Also, a buffer member 25 such as a rubber or a polyurethane foam is placed between the front top portion 22 and the container 14 for reducing the shock during driving. Also, the vehicle protective cover 10 of the present invention can be easily attached to a used car.

In operation, the sheet material 11 is amde to cover the roof of the vehicle 19 by pulling out the rod 12 (FIG. 1) when desired. For example, if snow 27 has accumulated on the sheet material 11, the actuation of the on-switch acts to rewind the cover on the roller 13 and removes the snow from the cover 10 during the process. As a result, the snow 27 tends to collect on the trunk lid 21 as seen in FIG. 3. The entrance 17 to the container is sealed by rubber gaskets 18 so that moisture and debris can be prevented from being introduced into the container. Furthermore, the user can adjust the length of the sheet material 11 to accomodate all sizes of vehicles. Since the rod 12 is weighty, the sheet material 11 will not move once the sheet material is in place. If necessary, the rod 12 may include a hook member to lock the sheet material in its extended portion.

The invention being thus described, it will be obvious that the same may be varied in many ways. Such variations are not to be regarded as a departure from the spirit and scope of the invention, and all such modifications as would be obvious to one skilled in the art are intended to be included in the scope of the following chaims.

What is claimed is:
1. A vehicle protective cover device adapted to be mounted in the trunk of a vehicle which comprises,
   a container mounted in the trunk,
   a buffer member placed between the container and the front top portion of the trunk,
   a sheet material wound around a roller, said roller being rotatably disposed within said container, said sheet material having a free end which is provided with a rod member, and motor means operatively associated with said roller whereby after the sheet material has been extended from the roller to cover the vehicle, the motor can be actuated to retract the sheet material to be stored within its container.

2. The vehicle protective cover device of claim 1 wherein the container is provided with an entrance aperture containing sealing gaskets for preventing debris from contaminating the container.

3. The vehicle protective cover device of claim 2 wherein the container contains flanges disposed at both edges thereof for mounting the device to a vehicle.

4. The vehicle protective cover device of claim 1 wherein the rod member is made of a rubber material.

5. The vehicle protective cover device of claim 4 wherein the rod member is made of a plastic material.

6. The vehicle protective cover device of claim 1 wherein the buffer is a rubber material.

7. The vehicle protective cover device of claim 1 wherein the buffer member is made of a polyurethane foam.

8. The vehicle protective cover device of claim 1 wherein the sheet material is made of water-proof plastic film.

9. The vehicle protective cover device of claim 1 wherein the sheet material is made of polythylene.

10. The vehicle protective cover device of claim 1 wherein the sheet material is made of polyvinyl chloride.

* * * * *